TELEPHONE CONNECTOR SYSTEM USING CONTROLLING CROSSBAR SWITCH

Filed Aug. 18, 1958

INVENTORS:
EDWARD J. LEONARD
ALBERT HEMEL
HARRY TARSCHISCH
KENNETH A. KAROW
JOHN C. GIBSON
KEITH L. LISTON
BY
Kegan, Bellamy & Kegan
ATTORNEYS May 22, 1962 E. J. LEONARD ET AL 3,036,160

TELEPHONE CONNECTOR SYSTEM USING CONTROLLING CROSSBAR SWITCH

Filed Aug. 18, 1958

5 Sheets-Sheet 2

May 22, 1962 E. J. LEONARD ET AL 3,036,160

TELEPHONE CONNECTOR SYSTEM USING CONTROLLING CROSSBAR SWITCH

Filed Aug. 18, 1958 5 Sheets-Sheet 3

May 22, 1962 E. J. LEONARD ET AL 3,036,160

TELEPHONE CONNECTOR SYSTEM USING CONTROLLING CROSSBAR SWITCH

Filed Aug. 18, 1958

5 Sheets-Sheet 4

May 22, 1962 E. J. LEONARD ET AL 3,036,160
TELEPHONE CONNECTOR SYSTEM USING CONTROLLING CROSSBAR SWITCH
Filed Aug. 18, 1958 5 Sheets-Sheet 5
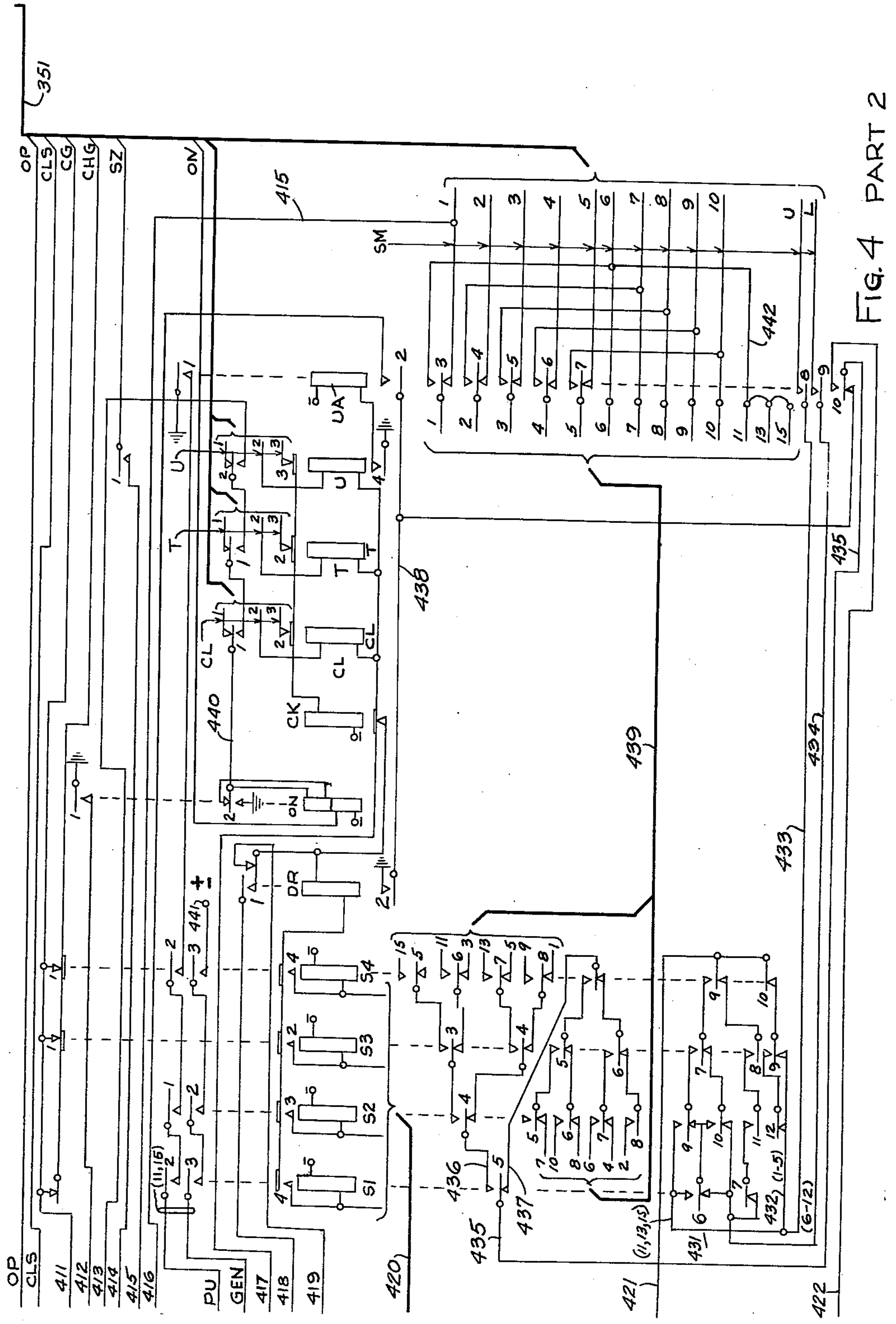
FIG. 4 PART 2

United States Patent Office 3,036,160

Patented May 22, 1962

3,036,160

TELEPHONE CONNECTOR SYSTEM USING CONTROLLING CROSSBAR SWITCH

Edward J. Leonard, Chicago, and Albert Hemel, Skokie, Ill., Harry Tarschisch, Zurich, Switzerland, Kenneth A. Karow, Chicago, John C. Gibson, Oak Lawn, and Keith L. Liston, Elmhurst, Ill., assignors to International Telephone and Telegraph Corporation, New York, N.Y., a corporation of Maryland Filed Aug. 18, 1958, Ser. No. 755,752
18 Claims. (Cl. 179—18)

Our invention relates to a telephone connector system. Its principal object is to provide a connector system employing standardized multi-purpose connectors, or cord circuits, which are economical in their use of relay apparatus and are yet able to establish any desired one of a number of classes of connections as required from time to time, as well as to apply ringing current selectively to called multi-station lines. It is thus an object to provide economical standardized connectors capable of meeting a great variety of service requirements, thereby effecting mass-production economies of manufacture as well as permitting all connectors serving a group of lines to be treated as one large group as distinct from two or more smaller groups.

This application is a continuation-in-part of our prior application Serial No. 564,605 for a Register-Translator Crossbar Telephone System, filed in the United States Patent Office January 20, 1956, now abandoned, and for the purpose of aiding comprehension of this application reference is made to our further application Serial No. 629,282, now Patent No. 2,918,533 issued December 22, 1959 for a Register-Translator Crossbar Telephone System, filed in the United States Patent Office December 19, 1956 as a continuation-in-part of the noted prior application Serial No. 564,605.

Itis common practice in automatic telephone systems to treat called lines as comprising respective groups (of one hundred lines, for example) and to provide a separate numerical group of trunks, termed connector trunks, for each such group of lines. Commonly, such trunk groups are accessible to hundreds selectors. The trunks in any such group are each provided with a connector, sometimes termed a cord circuit, and switching apparatus is provided to extend a connection from the connector to any called line of the line group. A connector includes a substantial amount of apparatus, consisting largely of control relays for controlling and supervising connections to called lines.

Commonly, at least one connector of a group is set aside for test purposes, and is termed a test connector. It is used by the wire chief in testing the condition of the lines of the group and is used by operators who wish to verify the apparent busy condition of a line, serving in the latter capacity as a verification connector. It is also common practice to equip at least some of the remaining connectors to serve either as local connectors, through which locally originated calls are completed, and as toll connectors, through which incoming toll calls are completed.

The foregoing well-known arrangement is open to the disadvantage that manufacturing efficiency is lowered by the necessity of providing several types of connectors. Moreover, the efficiency of the connectors and associated trunks of a group is substantially lowered by dividing the connectors into at least two smaller groups, as compared to the efficiency of the same number of connectors and associated trunks treated as one large group. A further disadvantage is that the amount of relay apparatus required in a combined toll and local connector is comparatively great because any such connector must be prepared to perform either service in addition to being able to distinguish, from information received, which service it is to perform. A further disadvantage of the known systems is that, where party lines are employed and are interspaced throughout the connector groups (as they must be eventually in view of the practical necessity of permitting upgrading and downgrading without accompanying changes of telephone numbers), each connector must include a substantial amount of relay or stepping-switch apparatus to permit station selection to be effected, particularly when the number of stations on some lines is relatively large, such as five or ten.

According to the invention, the foregoing disadvantages are overcome, and the connectors and associated trunks for handling all classes of calls are permitted to be placed in one efficient group and with but a minimum of relay apparatus in each connector, by supplying each connector with a switching device having groups of adapting contact sets which are separately selectable by apparatus common to all of the connectors of the group, with the selected ones of the contact sets being closable by a single electromagnet individual to a connector. By certain of the adapting contact sets, the connector can be adapted to operate as a test connector, as a verification connector, as a local connector, or as a toll connector, according to the adapting contact set closed, while other of the adapting contact sets adapt the connector to signal the called line according to which one of several stations on a called line is to be signalled.

Further, according to the invention, the individual selecting devices of the connectors of a group preferably take the form of separate verticals of a crossbar switch, referred to herein as a ringing switch. Additional verticals of the ringing switch are employed in succession to record respectively the class, tens, and units digits related to a call being processed, these latter verticals and the select magnets of the ringing switch being included in the common apparatus above referred to.

A further feature is that an additional adapting set of contacts is provided for locking a connector and its associated trunk out of service to free the associated common apparatus when seized because of a false seizure condition.

According to another feature of the invention the called lines are recognized as comprising separate classes, and the noted common apparatus detects the class of the called line according to the value of the ringing digit received, and accordingly (1) withholds or applies a preliminary ringing signal to the called line before the normal ringing action of a connector has started, and (2) selectively controls the adapting contact sets according to whether or not a local-call charge is to be made for calls to the called line.

The above-mentioned and other features and objects of this invention and the manner of attaining them will become more apparent, and the invention itself will be best understood, by reference to the following description of an embodiment of the invention taken in conjunction with the accompanying drawings, comprising FIGS. 1 to 4, wherein.

Figure 1:
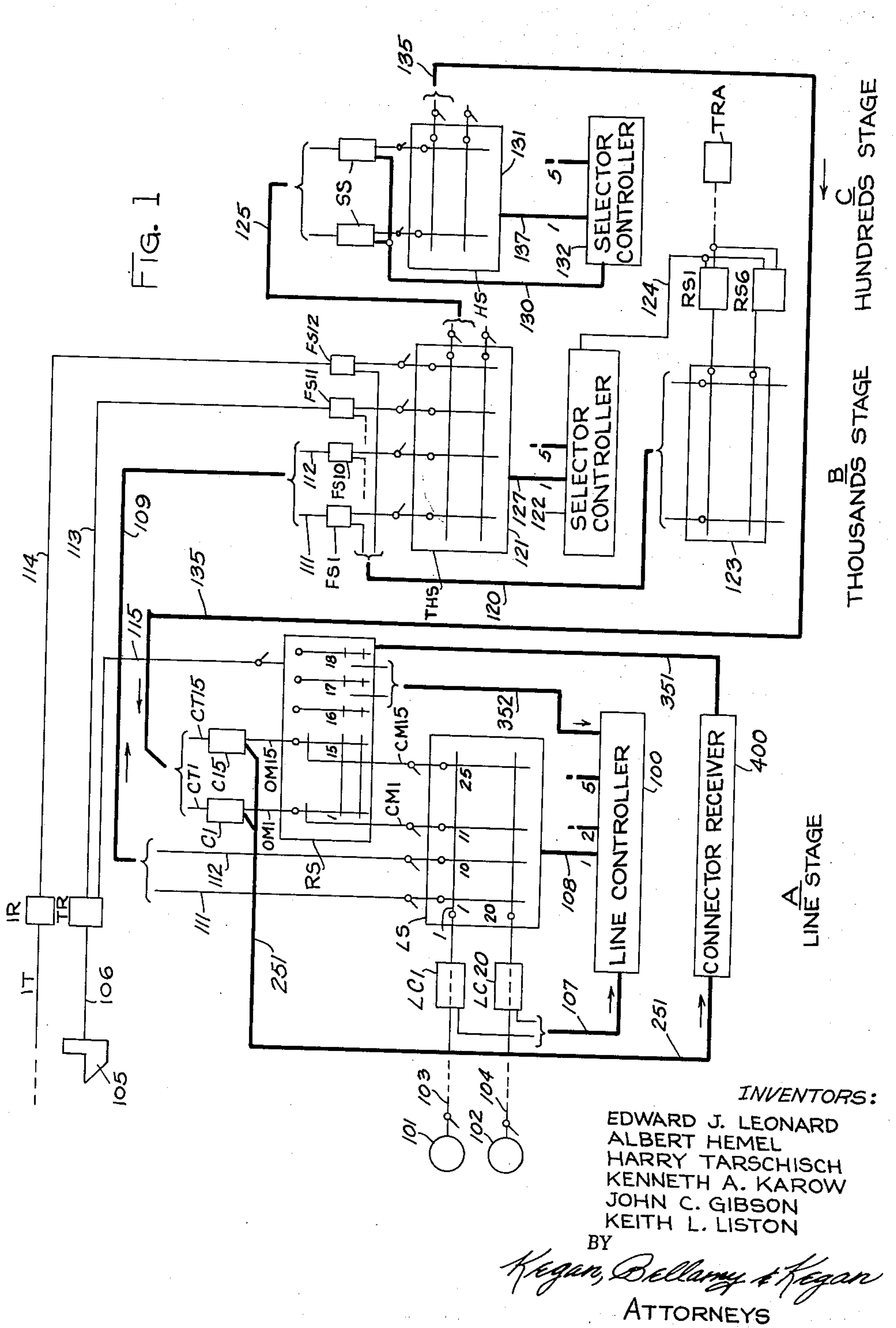
FIG. 1 is a single-line switching diagram of the essential portions of a selected system embodying the invention.
Figure 2:
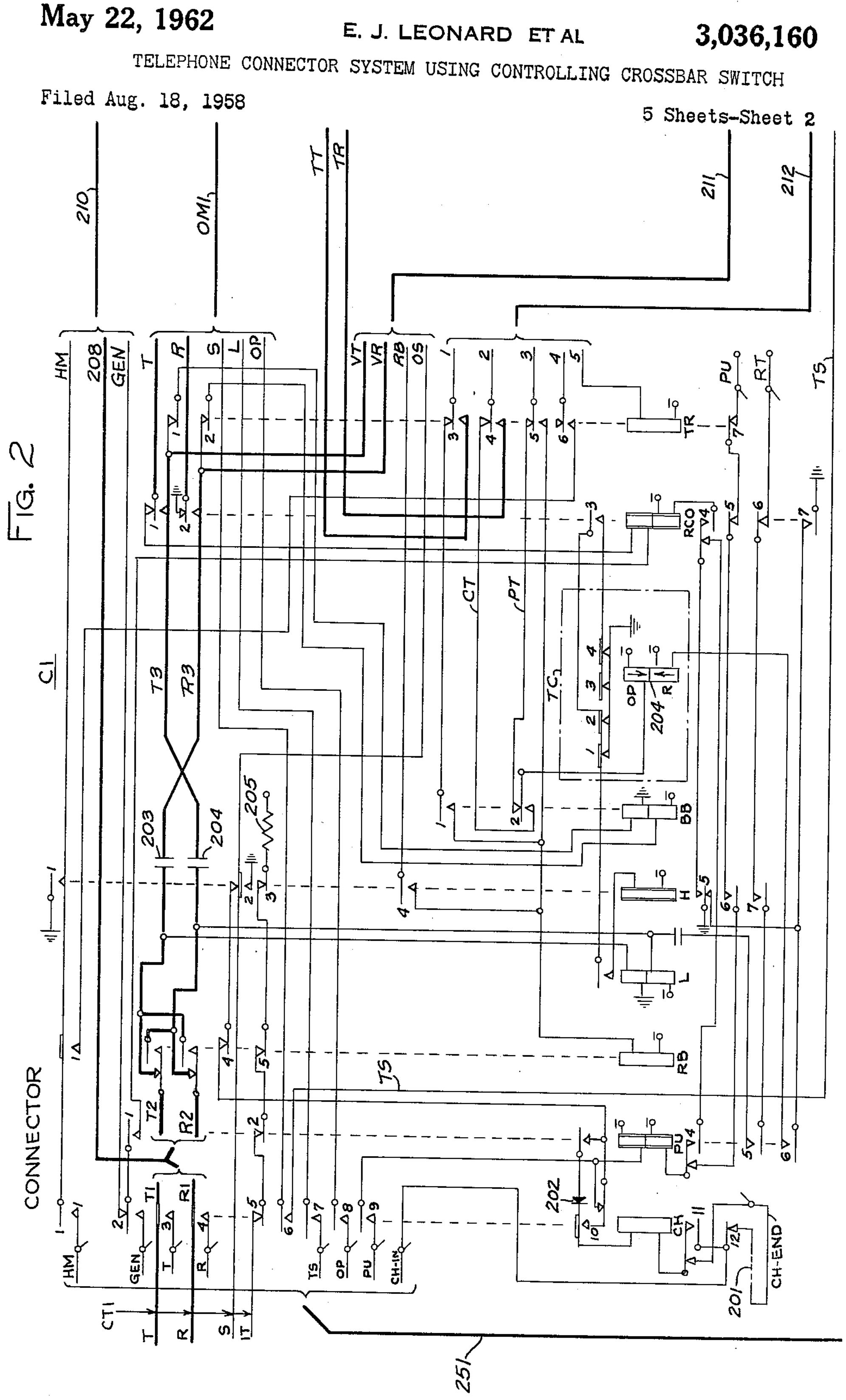
FIGS. 2 and 3 are circuit diagrams respectively of connector C1 and ringing switch RS of FIG. 1.
Figure 3:
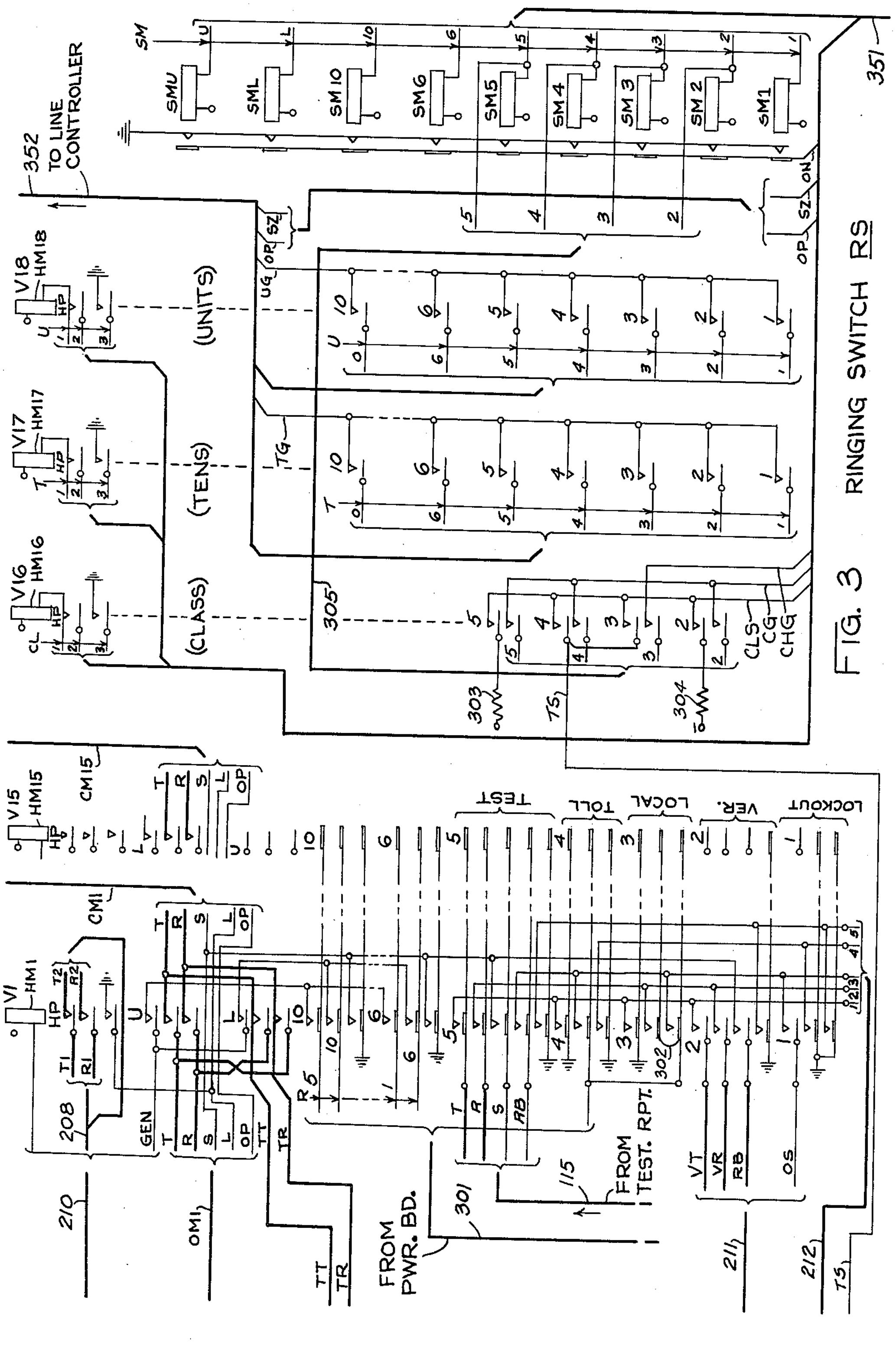
Figures 4, 5:
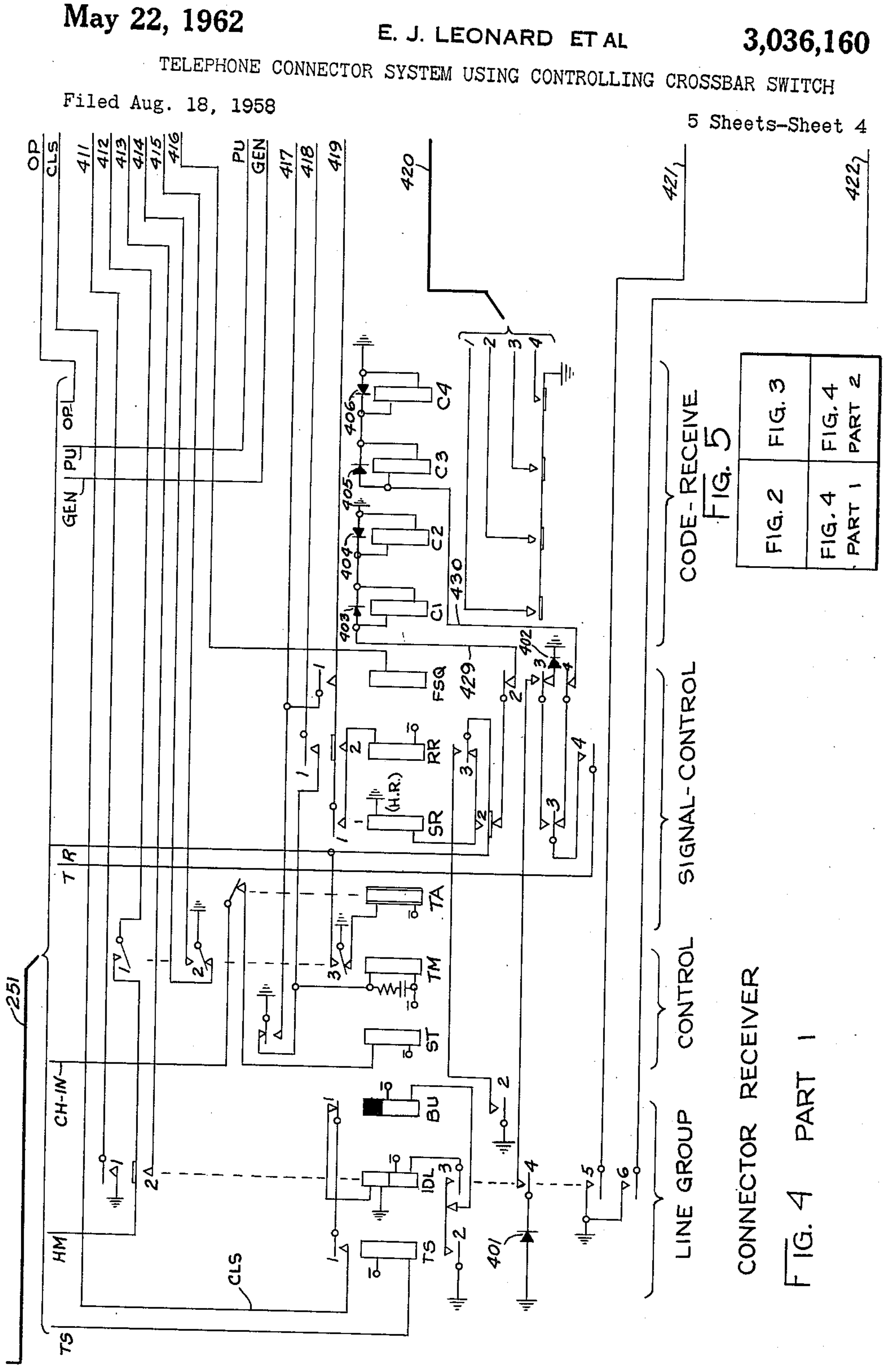

FIG. 4 (parts 1 and 2) is a schematic circuit diagram of connector receiver 400 of FIG. 1; and FIG. 5 shows FIGS. 2 to 4 assembled for the most ready understanding thereof.

*Figure 1—Switching Diagram*

FIG. 1 shows known crossbar switching apparatus of a local multi-thousand-line automatic telephone exchange or office, comprising line stage A, thousands stage B, and hundreds stage C. The illustrated apparatus at line stage A is for serving a 100-line group as calling lines and called lines, similar apparatus being provided for each other 100-line group of the local office. The lines of a 100-line group are treated as five 20-line groups. The illustrated lines 103 and 104, may be multi-station lines, serving stations such as 101 and 102. They are the first and the twentieth lines of the first 20-line group in the 100-line group, and have the usual line circuits LC1 and LC20 associated respectively therewith.

Line switch LS is a crossbar switch serving the 20-line group including lines 103 and 104. The lines appear on the horizontals of LS, of which horizontals 1 and 20 are shown. Originated calls are signalled by line circuits such as LC1 and LC20 to line controller 100, and are extended by way of idle ones of the trunks extending from the first ten verticals 1 to 10 of switch LS, and over trunks such as 111 and 112 of originating-trunk group 109. These and other originating trunks are multipled or graded as desired to verticals 1 to 10 of four other switches LS (not shown) which similarly serve the remaining four 20-line groups.

On receiving the tens and units marking of a particular calling line from a calling line circuit (such as LC1 or LC20) over conductor group 107, line controller 100 selects the corresponding one of the five switches LS, selection of the illustrated switch LS being over conductors in group 108. The select magnets of the selected switch are then set according to the identity of the calling line, following which the usual hold magnet at an idle one of the originating verticals 1 to 10 is closed to extend the calling line in the usual manner over an idle originating trunk (such as 111 or 112 of trunk group 109) to a first selector such as FS1 or FS10 of the thousands stage, whereupon line controller 100 is retired for handling connections including other lines.

Calls to lines of the indicated 100-line group are handled through the fifteen terminating verticals 11 to 25 of switch LS and of the other four similar switches in the same 100-line group. Such calls reach the indicated 100-line group over connector trunks such as CT1 and CT15 in trunk group 135 from hundreds stage C and are processed by the associated connector C1 to C15 through the conjoint action of connector receiver 400, line controller 100 and a switch LS, and ringing switch RS, as will be explained.

When a calling line is extended to a first selector such as FS1 or FS10, a branch connection is thereupon extended over a path in conductor group 120, and thence through a crosspoint in the register-sender selector switch 123, also a crossbar switch. The calling line is thus extended to an idle one of perhaps six register senders, such as RS1 to RS6. The seized register sender receives a class setting according to the class (local, toll, or test) of the path over which seized. Seizure from a local first selector FS1 to FS10 causes a local class setting at the register sender.

The called number is now dialed in the usual manner. The number for a locally terminated call comprises one or more digits indexing the local exchange or office, followed by thousands, hundreds, tens, and units digits indexing the particular station desired.

When the called number has been completely dialed, the register-sender, such as RS1, selects a translator such as TRA (if idle), which corresponds to the thousands digit of the dialed number, and then transmits to that translator signals indicative respectively of the hundreds, tens, and units digits of the called number. Such translator TRA thereupon causes the registering apparatus of RS1 to be cleared out; makes an individual translation of the final four digits of the called number, and transmits back to the register-sender RS1 a corresponding translated number comprising thousands, hundreds, tens, units, and stations digits, with the stations digit having a value which not only indexes the station location on the called line since multi-station lines are served, but also indicates the type of service, with respect to preliminary ring and charge or no-charge, to be accorded the called line.

The connected register sender RS1 thereupon seizes the associated selector controller 122 of the thousands stage B over conductors in group 124. Calls reach thousands selector stage B through selectors such as FS1 to FS12 and over the verticals of thousands-selector crossbar switches such as THS, from the horizontals of which extend the trunks comprising the numerical groups or "levels" referred to in connection with selectors in automatic telephone systems. One switch THS commonly serves two ten-trunk numerical groups or levels of trunks, and the verticals of such a switch are multipled to corresponding verticals of other switches THS as required. A total of five switches THS are used when ten 10-trunk groups of trunks are to be reached from a group of selectors such as FS1 to FS12, with the usual grading and multipling between groups being employed for trunk groups in excess of ten. Through the action of selector controller 122, the trunks in the numerical group corresponding to the thousands digit received by the selector controller from RS1 are tested and an idle one is selected. Thereupon, the connection from the calling first selector, such as FS1, is extended forwardly through a crosspoint of one of the switches THS to the selected idle trunk, a trunk in conductor group 125 for example, leading to the 1000-line group served by the illustrated second selectors SS.

The second selectors SS in which the seized trunk terminates is thereupon seized, and the selector controller 122 is retired from the connection by the freeing of conductor group 124 at the calling register sender RS1.

The hundreds stage C is provided with selectors HS as explained for selectors THS at stage B.

Upon seizure of a second selector SS, the associated selector controller 132 is called in over the conductors in group 130. Thereupon, the calling register sender RS1 transmits coded digit information to the selector controller 132 through the associated closed crosspoint of switch 123, conductors in group 120, to the first selector FS1, and thence forwardly over the connection established to the seized second selector, and thence to the associated selector controller 132. Selector controller 132 decodes the received hundreds digit information and selects the corresponding trunk group, and an idle trunk therein, which may be assumed to be connector trunk CT1 in group 135 leading to connector C1 illustrated at line stage A, being one of fifteen trunks CT1 to CT15 leading respectively to connectors C1 to C15. When trunk CT1 has been seized, selector controller 132 is retired from the connection and returned to common use.

Upon seizure of a connector, such as C1 over its trunk CT1, connector receiver 400 (if idle) is seized over conductors in group 251 and is rendered temporarily individual to the calling connector C1, following which the register sender transmits forward to the connector receiver 400 a class digit indicative of the class of the connection established, followed by tens, units, and stations digits indexing the called line and the station location of the called station thereon. Connector receiver 400 receives these digits successively and controls ringing switch RS in accordance with their respective values. The class, the tens, and the units digits, are thereby stored in verticals 16, 17, and 18 of switch RS in a manner to be explained hereinafter, with the stations digit being held temporarily within the connector receiver.

When the tens and units digits indexing the called line have been stored in switch RS, line controller 100 is seized for connector action, and corresponding information is transmitted to the line controller from RS, over conductors in group 352.

Line controller 100 now operates the select magnets on the one of the associated switches LS which has access to the called line to prepare for the closing of crosspoints for extending any one of the connector multiples CM1 to CM15 to the called line. When that selection has been effected, a signal is passed back to the line controller over a conductor in groups 352 and 351, and is relayed forward through contacts of the calling connector and over a conductor in its connector multiple, such as CM1, to cause crosspoint closure to occur which extends the usual tip, ring, and sleeve conductors of connector multiple CM1 to the called line.

Testing of the called line now occurs in connector receiver 400. If the called line is idle, operations then occur to position the pertaining vertical of the ringing switch RS (vertical 1 for connector C1) according to the class and the ringing information, following which ringing current is applied to the called line from the connector C1. In response to a signal from connector receiver 400, the connection is closed through at the first selector such as FS1 and the register-sender in use such as RS1 is freed and returned to common use, leaving the holding of the connection under the control of the calling line by way of the concerned connector such as C1. Connector receiver 400 and line controller 100 are also returned to common use at this time.

Incoming toll calls may be handled over incoming trunk IT, incoming repeater IR, local extension trunk 114, and first selector FS12. Access to a register-sender such as RS1 is as described. The register sender recognizes the call as a toll call from the fact of its seizure over an incoming trunk and first selector either set aside for toll use or adapted for toll use on seizure in a toll connection. From first selector FS12, the connection may be extended to a line, such as 103 or 104, by operations as described except that the class digit sent by the register sender and recorder in ringing switch RS for the seized connector is the toll class instead of the local class, adapting the connector accordingly as will be described hereinafter.

Incoming trunk IT may also be used for busy verification or toll-offering service wherein a talking connection is made to a line although marked busy. For this purpose, a verification prefix is employed, comprising a combination of one or more digits, which are received by the register-sender to signal that a verification connection is being set up. The forward progress of such a connection is as described before, except that the verification class of the connection is sent to, and recorded on, the ringing switch, such as RS, to cause the seized connector to be adapted for verification operation.

A test connection may be established to any desired local line from the wire chief's test desk 105 by way of test trunk 106, test repeater TR, trunk extension 113, and first selector FS11. Upon seizure of FS11 through TR, a register sender such as RS1 is called in as described, and the test class of the connection is indicated therein because of its seizure from test selector FS11. The further extension of the test connection is as described except that the class information transmitted in due time to the ringing switch RS causes the seized connector to be adapted for test operation. For test purposes, conductors in addition to the usual three conductors (tip, ring, and sleeve) are required to be included in the established connection to finally become connected with the respective conductors of the called line. Such additional conductors are included in group 115 extending from test repeater TR. They may be connected in common to all of the ringing switches RS without interference if only one test trunk is employed at a time, which condition is herein assumed.

*FIGURES 2 to 4—Apparatus*

Referring to FIGS. 2 to 4, the connector C1 of FIG. 2 is one of the fifteen connectors C1 to C15 of FIG. 1. It is reached over trunk CT1, which comprises the usual tip, ring, and sleeve conductors T, R, and S, which are reached through crosspoints of crossbar switches HS of the hundreds stage C, and further comprises an idle-test conductor IT which is used by selector controllers such as 132 in making the usual busy test of CT1.

Connector C1 includes chain relay CH for seizing the connector receiver of FIG. 4; pick-up, reverse-battery, line, and hold relays PU, RB, L, and H; back-bridge relay BB, timing counter TC, ring-cutoff relay RCO, and transfer relay TR. Connector C1 further includes vertical V1 of ringing switch RS of FIGS. 1 and 3. While verticals V2 to V15 (V2 to V14 not shown) of RS comprise respective portions of connectors C2 to C15 of FIG. 1.

Verticals V16 to V18 of RS are used respectively for storage of the class, tens, and units digit information received and decoded by the connector receiver of FIG. 4.

The select magnets for ringing switch RS comprise ten principal select magnets SM1 to SM10, which correspond respectively to contact sets 1 to 10 of the several verticals of the ringing switch, and extension-select magnets SML and SMU which correspond respectively to the so-called lower and upper contact sets L and U of verticals V1 to V15. Selected contacts in any of the verticals V1 to V18 of the ringing switch are closed upon operation of the corresponding one of the hold magnets HM1 to HM18. Each such hold magnet, on operating, not only closes any selected one of its contact sets 1 to 10, L, and U, but closes its hold-pilot set of contacts HP, irrespective of the selection currently standing at the select magnets.

The connector receiver of FIG. 4 comprises the illustrated interrelated functional groups of relays. The line group comprises test-start, idle, and busy relays TS, IDL, and BU; the control group comprises start, timing, and timing-auxiliary relays ST, TM, and TA; the signal-control group comprises sender-ready relay SR, receiver-ready relay RR, and final-sequence relay FSO; the code-receiver group comprises the rectifier-poled relays C1 to C4; the decode group comprises storage relays S1 to S4 and digit-received relay DR; and the sequence group comprises off-normal relay ON controlled by the select magnets of ringing switch RS, check relay CK; class, tens, and units transfer relays, CL, T, and U, and the units-auxiliary relay UA.

*Detailed Description—Local Calls*

The operations involved in handling local calls as from line 103 to line 104 of FIG. 1, will now be described in detail with respect to FIGS. 2 to 4.

On the removal of the receiver or handset at the calling station, such as 101 on line 103, operations as generally outlined hereinbefore occur. Line circuit LC1, line controller 101, and switch LS may now cause the calling line 103 to be extended by way of an idle trunk such as 111, to a first selector such as FS1, and a branch connection to be extended therefrom through crosspoints in sender-selector switch 123 to an idle register-sender such as RS1. RS1 thereupon records the fact of the local (non-toll) origin of the call and thus prepares for later transmitting a class digit of local value (class digit 3).

When all of the digits in the number of the called station have been recorded at RS1, a translator such as TRA is temporarily seized, as described. It thereupon individually translates a four-digit combination comprising the thousands, hundreds, tens, and units digits in the number of the called station into a five-digit combination which comprises thousands, hundreds, tens, and units digits indexing the switchboard location of the line on which the called station is located, and a stations digit indexing the station location of the called station on the called line. The translated 5-digit combination is stored in RS1, whereupon TRA is freed for use with other register senders.

The translated thousands and hundreds digits are next transmitted in succession to cause the connection to be extended as described through the thousands stage B and the hundreds stage C to an idle connector trunk in conductor group 135, connector trunk CT1, for example.

Referring to FIG. 2, the normal idle condition of the connector C1 of FIG. 3 is indicated by battery potential on conductor IT of trunk CT1, through resistor 205 and contacts of relays H, RB, PU, and H, and is recognized by any selector controller 132 having test access to trunk CT1.

The described seizure of trunk CT1 closes a connection from RS1 to conductors T, R, and S of CT1, causing ground potential to appear on conductor S of CT1, extended forward from RS1, which is held from calling line 103.

Ground on conductor S of CT1 closes a circuit through back contacts 2 and 4 of relays H and RB for energizing the upper winding of relay PU, through closed contacts 10 of CH. Relay PU, a double-duty seizure-start and pick-up relay, now operates temporarily in its seizure-start capacity. Contacts 2 of PU open IT of trunk CT1 to mark the trunk busy, and its contacts 3 extend the incoming sleeve ground through diode 202 to the upper winding terminal of chain relay CH. Relay CH of C1 is interconnected in a preference lock-out chain with the corresponding relays of the other fourteen connectors of the group. If connector-receiver is idle (none of the other chain relays CH operated), battery potential on chain-in conductor CH-IN in group 251 is extended to the lower terminal of chain relay CH, through chain contacts 12 of the several chain relays as indicated at 201, to chain-end conductor CH-END (common to all of the chain relays), and thence through contacts 11 of CH to the lower winding terminal thereof. Relay CH is accordingly operated in series with start relay ST of the connector receiver. At its contacts 10, it locks itself to ground on S of CT1 independent of contacts 3 of PU, at the same time open-circuiting PU, which restores a moment later. Contacts 11 of CH lock the lower-winding terminal of CH to the incoming chain conductor and disconnect that terminal from CH-END. Contacts 12 of CH open the chain path to conductor CH-END to preclude operation for the time being of a relay CH in another connector of the group. Contacts 1 to 4 and 7 to 9 of CH connect the associated conductors in group 251 to respective conductors of C1; its contacts 5 maintain the busy-marking condition on IT after relay PU restores; and its contacts 6 connect the common terminating sleeve conductor TS, associated with ringing switch RS, individually with conductor S in out-multiple OM1 and connector-multiple CM1 of C1 preparatory to line testing.

In connector receiver 400 of FIG. 4, start relay ST grounds the master ground conductor 417 as a preparatory operation, thereby grounding conductor 419 through contacts of relay DR as a further preparatory operation. Relay ST also open-circuits timing relay TM. Relay RM is shunted by the illustrated condenser, of fairly high capacity, in series with the illustrated resistor, causing relay TM to hold operated under open-circuit condition for perhaps a second or so. Relay TM is thus arranged to restore and clear out the connector receiver as hereinafter described in the event of its false seizure by a connector, or in the event that the calling register sender fails for any reason to transmit digit information. Normally, therefore, the normally energized relay TM remains operated continuously during operations of the connector receiver, and holds TA operated continuously.

With conductors T and R of CT1 extended respectively to conductors T and R in group 251, the signal-control relays of the connector receiver are placed in communication with the connected register sender RS1 of FIG. 1.

When the register sender is ready to transmit the next item of digit information (the recorded class digit 3, indicative of a local call), it places battery on conductor R of CT1 and 251, thereby operating the high-resistance sender-ready relay SR through back contact 3 of RR. Relay RR is thereby operated from, and locked to ground on conductor 419. Relay SR remains locked temporarily to conductor TR through its front contact 2.

A receiver-ready signal is now placed on conductor R of 251, from ground through diode 402, back contact 3 of FSQ, and front contacts 3 and 4 of SR and RR. Upon receipt of this ready signal, the connected register sender temporarily opens conductors T and R of 251, restoring relay SR and leaving relay RR locked operated to ground on 419. Conductors R and T of 251 are thereby extended over conductors 429 and 430 to the code-receiver relays; C1 and C2 for conductor R, and C3 and C4 for conductor T. Relays C1 to C4 are rectifier polarized at 403 to 406 for the reception of negative and positive coded digit pulses which may comprise respective half cycles of rectified 60-cycle current according to the following code table covering digit values from 1 to 15.

CODE TABLE

| Digit values | C1 | C2 | C3 | C4 |
|---|---|---|---|---|
| 1 | X | | | |
| 2 | | X | | |
| 3 | X | X | | |
| 4 | | | X | |
| 5 | X | | X | |
| 6 | | X | X | |
| 7 | | | X | X |
| 8 | | | | X |
| 9 | X | | | X |
| 10 | | X | | X |
| 11 | X | X | | X |
| 12 | X | X | X | |
| 13 | X | | X | X |
| 14 | | X | X | X |
| 15 | X | X | X | X |

In the above code table, the letter "X" is used for each relay C1 to C4 to indicate each digit value for which it is operated. It will be observed that each digit value includes the operation of at least one of the code relays, and that the final digit value (15) includes the operation of all four code relays.

The calling sender remains in code-sending position for any digit being transmitted for an interval somewhat longer than one cycle of 60-cycle current, during which all elements of the current digit code are transmitted, the transmission being in swift succession over either conductor 429 or 430 to ground, and being concurrent over the two of them. The temporary operation therefore occurs of each of the relays C1 to C4 which corresponds to an element of the code currently being transmitted. The corresponding ones of the storage relays S1 to S4 the decode group are operated over conductors 420. Each operated relay S1 to S4 locks itself to ground on conductor 417 through the winding of digit-received relay DR and contacts of relay CK.

When the instant digit transmission has ended, and all of the code relays C1 to C4 are again restored, relay DR operates in the locking circuit of one or more of the storage relays S1 to S4. Its contacts 1 unground conductor 419 to restore receiver-ready relay RR, and its contacts 2 ground conductor 438 to initiate the transmission of decoded digit information to the ringing switch RR according to the current setting of relays S1 to S4.

Upon the closure of front contact 1 of DR, and during the interval of perhaps 20 milliseconds required for relay RR to restore, ground on conductor 418 is extended through front contact 1 of relay RR to reenergize timing relay TM, and to recharge its associated timing condenser through the illustrated resistor, thereby starting a new timing period beginning with the described restoration of RR at the end of the receipt of any group of coded digit pulses.

With relays SR and RR of the signal-control group again both restored, relay SR is ready to respond again as described upon the next application of a sender-ready signal to conductor R of 251 by the calling sender pursuant to the transmission by the register sender of the next succeeding group of digit signals, but receiver-ready relay RR cannot be reoperated until the stored information on S1 to S4 has been utilized and S1 to S4 and DR have been unlocked, as will be later described.

The first group of digit signals received from the calling register is the class group, and it has a digit value according to the foregoing code table of 2, 3, 4, or 5, depending upon whether the call being handled is a verification call, a local call, a toll call, or a test call, as shown in the following class table:

CLASS TABLE

| Class digit: | Class |
|---|---|
| 1 | Lockout. |
| 2 | Verification. |
| 3 | Local. |
| 4 | Toll. |
| 5 | Test. |

Referring to the above table, one of the class-digit values 2 to 5 is received from the register sender according to the class of the connection being extended, whereas class digit 1, for lockout operation, is originated in the connector receiver when required, as is hereinafter described.

In the assumed example, a local call is in progress (from line 103), wherefore the received class digit has the value 3. Storage relays S1 and S2 are consequently operated, by code relays C1 and C2, and are locked in series with DR as described. Conductor 438, grounded at contacts 2 of DR, normally extends through a back contact of the units auxiliary relay UA to the apex of the principal contact tree of S1 to S4, by way of conductor 435. This contact tree extends by way of a front contact of relay S1 to conductor 436 and thence through contacts of relays S2 to S4 to digit conductors 1, 3, 5, 9, 11, 13, and 15. Through a back contact of relay S1, the principal contact tree extends over conductor 437 and contacts of relays S4, S3, and S2, to digit conductors 2, 4, 6, 7, 8, and 10. Assigned digit values 12 and 14 are unused. Consequently, back contact 5 of relay S4, and front contact 5 of relay S2, are left unconnected. The digit conductors corresponding to values 1 to 11, 13, 15 are extended, through conductors in group 439, into the illustrated association with select magnet leads SM1 to SM10 of group 351 which extend to ringing switch RS.

With relays S1 and S2 operated and relays S3 and S4 restored (for local class digit 3), the ground on conductor 435 is extended through contacts of these relays to conductor 3 in group 439, and thence through a back contact of relay UA to conductor SM3 in group 351, thereby energizing select magnet SM3 of ringing switch RS to select contact set 3 in each of the verticals V1 to V18.

Upon the operation of any of the select magnets of RS, conductor ON in group 351 is grounded as a signal that select magnet operation has been effected, thereby closing a circuit for the lower winding of relay ON of FIG. 4. Relay ON is somewhat slow in operating (by virtue of its normally short-circuited upper winding), thereby allowing time for the operation of other select magnets to occur when more than one select magnet of RS is to be operated at the same time.

On operating, relay ON opens the short-circuit from around its upper winding and places ground on sequence conductor 440. With class sequence relay CL restored, ground on conductor 440 reaches conductor CL1 of group 351 through back contact 2 of CL, thereby actuating hold magnet HM16 of the class vertical V16. Hold pilot contacts HP of HM16 are thereby actuated, along with the selected contact set 3 of vertical 16.

The closure of contact set 3 of V16 records the class digit 3, while the closure of hold pilot contacts HP of V16 extends the ground on conductor CL1 to conductor CL2, and grounds conductor CL3. The grounding of CL2 closes a locking circuit for HM16 in series with relay CL of the connector receiver, which becomes effective on the opening of the initial circuit of HM16.

The grounding of conductor CL3 operates relay CK through back contact 2 of CL. Relay CK open-circuits relay DR, causing all operated relays S1 to S4 and DR to restore.

The removal of ground from conductor 438 at contacts 2 of DR, along with the release of all relays S1 to S4, ungrounds digit conductor 3 in group 439, open-circuiting the energized select magnet SM3 of the ringing switch. Upon the restoration of that magnet, conductor ON of 351 becomes ungrounded, restoring off-normal relay ON of the connector receiver. The consequent ungrounding of conductor 440 opens the initial circuit of HM16 of the ringing switch, leaving that magnet energized in its locking circuit through class-sequence relay CL, and causing relay CL to operate. The now-ungrounded conductor 440 is thereby transferred to contacts of the tens-transfer relay T. Check relay CK is thereby disconnected and restored, again preparing a locking circuit for relays S1 to S4 and an operating circuit for DR and RR.

With CK and DR again both restored, ground on conductor 417 is again applied to conductor 419 to permit receiver-ready relay RR to again obey relay SR to cause the register sender to transmit the next digit in the number, which is the tens digit.

When the tens digit is received on relays C1 to C4 and stored on self-locking relays S1 to S4, relay DR again operates on the restoration of all of the relays C1 to C4, again grounding conductor 438. This time, there is grounded the one of the conductors 1 to 10 in group 439 which corresponds to the value of the tens digit of the number. The corresponding one of the select magnets SM1 to SM10 of RS is thereupon operated, followed by the described operation of relay ON to again ground conductor 440. Conductor T1 of group 351 is thereby grounded to operate hold magnet HM17 of the tens vertical V17 of RS, to close the one of its contact sets 1 to 10 which corresponds to the received tens digit. Relay CK is thereupon operated over conductor T3 of 351, to clear out relays S1 to S4 and DR. Select-magnet restoration thereupon occurs in RS, and relay ON responsively restores. Tens sequence relay T thereupon operates in the locking circuit of HM17, over conductor T2 of 351, restoring CK to permit receipt and storage of the units digit.

When the units digit is received, relays S1 to S4 ground the corresponding one of the conductors 1 to 10 of 439 to again operate one of the select magnets SM1 to SM10 of RS, the one corresponding to the stored units digit. With relays CL and T of the connector receiver operated, the operation of relay ON to ground conductor 440, grounds conductor U1 of 351, operating hold magnet HM18 to close the selected one of its contact sets 1 to 10 and its set of hold-pilot contacts HP.

Operations as described in connection with the receipt of the preceding digits now occur, which result in the operation of units-transfer relay U, following the operation of CK to clear out S1 to S4 and DR, succeeded by the restoration of ON, the operation of relay U in the locking circuit of HM18, and the restoration of CK to prepare for the receipt of the units digit.

Units-auxiliary relay UA is operated by relay U to effect a translation of the stations digit values 1 to 5 into respective values 6 to 10 by disconnecting conductors 1 to 5 of 439 from conductors SM1 to SM5 and transferring them to conductors SM6 to SM10 respectively.

Contacts 2 of relay UA prepare a circuit for final-sequence relay FSQ which becomes closed following the setting of relays S1 to S4 in accordance with the station digit value and the consequent operation thereafter of relay DR. The station digit value is held stored within relays S1 to S4 for the time being, being transferred to the ringing switch only if the called line tests idle.

When DR operates at the end of the storage of the stations digit, it again restores RR. The grounding of conductor 438 by DR now has no effect on the contact tree beginning at conductor 435, because back contact 10 of relay UA is now open. Ground on 438 now extends through contacts 2 of UA and over conductor 416 to operate final sequence relay FSQ, which disconnects relays C1 to C4 and prepares for signalling through contacts of idle and busy relays IDL and BU of the line group.

Following the receipt of the stations digit, sender-ready relay SR is reoperated when the register sender is ready for line-test information from IDL and BU. Relay RR thereupon operates through contacts 1 or SR and FSQ from grounded conductor 417 and locks operated until the controller is cleared out.

Final switching operations are initiated following receipt of the units digit, and without awaiting receipt of the stations digit. When contacts 1 of relay U close at the end of the receipt and the described storage of the units digit on vertical V18 of RS, ground from conductor 414 is thereby placed on seizing conductor SZ in group 351, being extended as seizing conductor SZ in group 352 leading to line controller 100 of FIG. 1. Ground on this conductor immediately seizes line controller 100 for connector action unless it is temporarily busy in handling an originating call, in which event it is immediately seized for connector action as soon as it has completed handling the originating call.

When the line controller 100 is thus seized for connector action, it grounds tens-ground and units-ground conductors TG and UG in group 352, thereby grounding the selected one of the tens conductors T1 to T0 and of the units conductors U1 to U0 in group 352, according to the digit settings stored at V17 and V18. The tens and units digit information identifying the called line is thereby transmitted to the line controller 100, which correspondingly sets select magnets (not shown) at switch LS or at one of the other four switches LS associated with the five 20-line groups making up the 100-line group served by connectors C1 to C15.

When line selection (select-magnet operation) has been completed at the pertaining switch LS, line controller 100 grounds operate conductor OP in group 352, which is extended as conductor OP in groups 351 and 251. Ground on this conductor is thereby extended through contacts 8 of relay CH of FIG. 2 and thence to conductor OP in connector multiple CM1 of FIGS. 3 and 1, thereby causing hold magnet operation to occur at the prepared switch LS which extends conductors T, R, and S of CM1 to the corresponding conductors of the called line, such as 104. The operated hold magnet at LS prepares a self-locking circuit by connecting its operating conductor to locking conductor L of CM1, grounding the latter conductor. Test-start conductor TS of group 251 is thereby grounded through contacts 7 of relay CH of the connector as a signal that connection has been made with the called line and that the testing thereof as to its busy or idle condition may now occur.

Contacts 1 of test-start relay TS connect called-line-sleeve conductor CLS to ground through contacts 1 of relay BU, and the upper winding of idle relay IDL, and contacts 2 close a circuit for the slow-operating busy relay BU through contacts 3 of relay IDL.

On the local call being described (class digit 3), and on a toll call (class digit 4), conductor CLS of 351 is connected to terminating sleeve conductor TS at contact set 3 or 4 of V16. Conductor TS is common to all of the connectors C1 to C15. With chain relay CH of connector C1 operated, conductor TS is extended through contact 6 of CH, to sleeve conductor S of OM1 and of CM1, by way of which it is extended to the sleeve conductor of the called line.

If the called line is busy, relay IDL fails to operate for the lack of an idle-indicating battery potential on the sleeve conductor of the called line. Relay BU of the connector receiver is therefore permitted to operate. It disconnects relay IDL at its contacts 1. At its contacts 2 (assuming relays SR and RR to have reoperated as described at the end of the stations digit transmission), it grounds conductor R of 251 through front contact 3 of RR, thereby signalling the calling register sender, such as RS1, that the called line is busy, which thereupon causes a busy signal to be returned to the calling line and causes the extension beyond the calling first selector to be released, accompanied by the freeing of the calling register sender. The consequent freeing of connector CT1 causes connector C1 and the connector receiver to clear out.

On the other hand, if the called line is idle, relay IDL operates from battery on the sleeve conductor of the called line before relay BU can operate. Contacts 3 of IDL open-circuit relay BU, at the same time locking to ground through contacts 2 of TS. Contacts 4 of relay IDL transmit a line-idle signal to the calling register sender, through diode 401 and front contacts of relays FSQ, SR, and RR, to the tip conductor T of the established connection, causing the register sender to execute a switching-through operation at the first selector in use and to retire from the connection a short time later to leave the holding of the connection under the control of connector C1.

A combination of select magnets must now be operated in ringing switch RS to select contact sets to be closed in vertical V1, assigned to connector C1. Circuits for these select magnets are closed at contacts 1, 5, and 6 of relay IDL. The select magnets to be operated depend on the value of the class digit stored on V16 of RS according to the foregoing class table and upon the value of the ringing digit now stored in relays S1 to S4 of the connector receiver. The effect of the respective assigned values of the stations digit is as shown in the following stations-digit table:

STATIONS-DIGIT TABLE

| Digit Values | Select Magnets | Ringing | Terminal Class |
|---|---|---|---|
| 1 | U, 6 | T, F1 | Normal. |
| 2 | U, 7 | T, F2 | Do. |
| 3 | U, 8 | T, F3 | Do. |
| 4 | U, 9 | T, F4 | Do. |
| 5 | U, 10 | T, F5 | Do. |
| 6 | L, 6 | R, F1 | Do. |
| 7 | L, 7 | R, F2 | Do. |
| 8 | L, 8 | R, F3 | Do. |
| 9 | L, 9 | R, F4 | Do. |
| 10 | L, 10 | R, F5 | Do. |
| 11 | U, 6 | T, F1 | PR. |
| 13 | U, 6 | T, F1 | NC. |
| 15 | U, 6 | T, F1 | PR, NC. |

In the above table, the notations under "Select Magnets" refer to select magnets of RS; the notations under "Ringing" refer to conductors T and R of the called line and to the ringing frequency to be applied thereto; and the notations PR and NC under "Terminal Class" refer respectively to preliminary ring (as for immediate PBX signalling) and to no charge for local calls to the called station, or line.

Contacts 1 of relay IDL ground conductor 412, which enters group 351 as conductor CG, to effect select magnet operation when the class digit stored on V16 of the ringing switch is 2, 4, or 5. In the assumed example, the stored class digit is the local digit 3, and contact set 3 of V16 stands closed. The select magnet control of these contacts is over charge conductor CHG in group 351, which remains connected to conductor CG except when relays S1, S3, and S4 are all operated, which they are for stations digit 13 or 15. Normally, the stations-digit value is from 1 to 10 as shown in the foregoing Stations-Digit table. Consequently, ground on conductor CG is further extended, through contacts of one or more of the relays S1, S3, and S4, to CHG, and thence through contacts of set 3 of vertical V16 of the class switch, and over conductor 3 of group 305, to operate select magnet SM3 of the ringing switch for class selection, local.

Contacts 5 and 6 of IDL ground conductors 421 and 422 to cause the stations-digit information stored on the operated ones of relays S1 to S4 to be transmitted to select magnets of RS. Ground on conductor 422 extends through front contact 10 of UA, to conductor 435 leading to the apex of the principal contact tree of relays S1 to S4. If the stored station digit has any value 1 to 10, the corresponding one of the conductors 1 to 10 in group 439 becomes grounded. For values 1 to 5, the corresponding one of the conductors SM6 to SM10 of group 351 is operated through its corresponding front contact of relay UA, while, for values 6 to 10, the corresponding one of the conductors SM6 to SM10 is directly grounded by a conductor in group 439. In either event, one of the select magnets SM6 to SM10 of ringing switch RS is energized to select its corresponding contact sets 6 to 10 in the verticals of RS.

The grounding of conductor 421 renders effective the lowermost group of contacts of relays S1 to S4, being those over which select magnets SMU and SML of ringing switch RS are controlled for combinative operation with select magnets SM6 to SM10 to provide ten combination settings of these seven select magnets, as indicated in the foregoing stations-digit table. If the value of the ringing digit is from 1 to 5, ground on conductor 421 is extended through contacts of relays S2 to S4 to conductor 432, being one of the branches of conductor 433. In that event, ground on conductor 433 extends through contacts 8 of UA to conductor SMU, operating select magnet SMU of FIG. 3 for any one of the first five station locations on the called line.

On the other hand, if the station digit has any value from 6 to 10, conductor 434 is grounded through contacts of relays S1 to S4, closing a circuit through contacts 9 of UA and over conductor SML for operating select magnet SML of FIG. 3 for any station location 6 to 10 on the called line.

Thus, in the assumed example, the select magnets of RS now operated are SM3 (local class), one of the magnets SM6 to SM10, and either SMU or SML.

Relay ON is now reoperated by the select magnets of RS, again grounding conductor 440. Conductor 413 is thereby grounded through front contacts of relays CL, T, and U, thereby grounding HM of 251 through contacts 2 of IDL, operating hold magnet HM1 of the ringing switch through contacts 1 of relay CH. HM1 now closes its hold-pilot contacts HP and selective contact sets of V1 which have been selected by the three operated select magnets SM. Their contact sets are, (1) set U or L, (2) one of the sets 6 to 10, and (3) set 3.

The operated one of the sets 6 to 10 grounds the sleeve conductor of the called line by way of conductor S of CM1, to mark the called line busy and to clear it for the receipt of ringing current.

Closure of contact set HP of HM1 grounds locking conductor L of connector multiple CM1 to maintain the connection with the called line after line controller 100 has been retired therefrom, as shortly occurs.

Closure of contact set HP of HM1 also connects conductors T1 and R1 of group 208 respectively with conductors T2 and R2 of that group, thereby extending the incoming conductors T and R of CT1 to the windings of line relay L of the connector. Relay L now operates over T and R of trunk CT1 and the calling line (now switched through at first selector FS1), operating hold relay H through contacts of timing counter TC. Contacts 1 of relay H ground conductor HM of group 210 to maintain hold magnet HM1 operated; its contacts 3 further open IT of CT1; its front contacts 2 apply ground locally to conductor S of CT1 to maintain the established connection after the calling register sender has retired, as it shortly does; and back contact 2 of H open-circuits and restores chain relay CH of the connector and start relay ST of the connector receiver. The restoration of CH renders the connector receiver available to the other connectors.

The connector receiver now clears out, leaving relays TM and TA thereof as the only ones operated. The described seizure of line controller 100 for connector action is thereby terminated. At the same time, hold magnets HM16 to NM18 and the operated selected magnets of the ringing switch restore.

In the connector C1, the only relays now energized are L and H, along with HM1 of vertical V1 of the ringing switch.

STATION RINGING

Application of ringing current to signal the called station on the called line may now begin. Such current is received from ringing switch RS over conductor GEN in group 210. For stations 1 to 5 on the called line, ringing current is supplied to conductor GEN from one of the ringing conductors R1 to R5 in group 115, the associated contact set 6 to 10, conductor 311, and contact set U. For stations 6 to 10, ringing current reaches GEN from one of the ringing leads R6 to R10, the corresponding contact set 6 to 10, conductor 312, and contact set U.

From conductor GEN, the ringing current for stations 1 to 5 is applied to the tip conductor T of the called line, since contacts U of V1 are then closed. For stations 6 to 10, it is applied to the ring conductor R since contacts L of V1 are then closed. The reversal for ringing-current application is in the illustrated T and R leads at set U of V1.

For ten-station bridged ringing, which is often required where divided ringing is not feasible because of inductive interference, ringing leads R6 to R10 are so interrupted, for any ringing period, that two short applications of ringing current are received thereover instead of one application over any lead R1 to R5. This provides the usual one-ring and two-ring semi-selective arrangement.

Because of the noted requirement of one-ring and two-ring semi-selective operation, a pickup operation is provided for in the connector C1 to complete the ringing through the connector only during the silent interval. With relay H operated as described, the next application of ground potential to the common pickup lead PU by the ringing interrupter apparatus (not shown), a circuit is closed through contacts 7 and 5 of TR and RCO, and contacts 6 of H, for the lower winding of relay PU. Relay PU thereupon operates and locks to ground through contacts 4 and 5 of RCO and H. Ringing tone is now applied to the calling line from the common ringing-tone conductor RT, and through contacts 6, 7, and 5 of RCO, H, and PU. During succeeding ringing cycles, ringing current from GEN passes through contacts 2 and 1 of CH and PU, and thence through the line winding of RCO and back contact 1 thereof to conductor T in group OM1. From this point, the ringing current reaches the called line by way of the tip conductor T or the ring conductor R of connector multiple CM1, depending upon whether contact set U or L is closed at vertical V1. A return path to ground is provided over conductor R of OM1 and back contact 2 of RCO.

When the call is answered, the consequent flow of direct current through the upper winding of RCO causes RCO to operate. RCO is thereupon locked operated at its front contact 4; contacts 4 and 5 disconnect and restore relay PU; contacts 6 disconnect ringing tone from the calling line; and contacts 1 and 2 open the ringing circuit and complete the talking circuit from conductors T3 and R3 to the called line by way of conductors T and R of OM1 and CM1.

Back bridge relay BB now operates over the called line, through contacts 1 and 2 of relays RCO and TR. Reverse-battery relay RB is thereby operated from ground through contact of set 3 of vertical V1, conductor 1 in group 212, back contact 3 of TR, and contact 1 of BB.

Contacts 4 and 5 of RB open circuit points which are currently inactive, and contacts 2 and 3 reverse the connections between the calling line and the windings of line relay L, thereby reversing current flow over the calling line for the usual supervisory and call-assessment purposes, such as to operate a polarized electromagnet at the calling station, if the call is from a pay station, to assess a charge for the call.

Conversation may now occur over the connection through connector C1, wherein the operated relays are RB, L, H, BB, and RCO, along with hold magnet HM1 of vertical V1 of ringing switch RS.

At the conclusion of conversation, the connection is released when the subscribers have both replaced their receivers or handsets. Relays BB and RB restore when the called line is opened. Relay L restores when the calling line is opened, open-circuiting slow-restoring release relay H, which restores a short time later. H restores RCO and magnet HM1 of the ringing switch, whereby the connection over CM1 to the called line is released. H also ungrounds conductor S of CT1, causing the connection from the calling line to the connector to be restored.

With CH, PU, RB, and H restored, idle-indicating battery potential through resistor 205 is again impressed on conductor IT of CT1.

PERMANENT AND CONVERSATION TIMING

Permanent and conversation timing at connector C1 are controlled by timing counter TC. Structurally, TC is a well-known residual-stock device, commonly referred to as a magnetic impulse counter. Its electromagnet 204 has sufficient residual characteristics to maintain its operated contacts with no current flowing through windings of 204. Winding OP is employed to operate the illustrated contact sets of TC in succession, one contact set for each impulse received by winding OP. The differentially connected high-resistance winding R is employed when desired to de-magnetize 204 to permit release of the operated contacts of TC.

Referring to the local-call operations described, when the described operation of hold magnet HM1 of the ringing switch occurs, followed by the operation of relays L and H of C1 and the consequent release of CH (which leaves only relays L and H operated in C1), followed a moment later by the described operation of pickup relay PU to close the ringing path, pulse conductor P1 in group 301 is extended through a contact in local set 3 of vertical V1, and over conductor 3 in group 212, and through back contact 5 of TR, to permanent-timing conductor PT, and thence through front contact 2 of BB to winding OP of magnet 204 of counter TC. Conductor P1 is grounded momentarily at desired intervals, such as at 2-minute intervals. Consequently, a momentary impulse is received by winding OP from conductor P1 on the next grounding of P1, and thereafter at 2-minute intervals. Contacts 1 of TC are opened responsive to the first impulse received by OP; contacts 2 are opened by the second impulse; and so on.

An interval of from two to four minutes is allowed for the ringing operation to occur, at the end of which time a permanent calling condition may be assumed if the connection is still being held and the call has not been answered. In the latter event, the opening of contacts 2 of TC with contacts 1 already open and with relay RCO not having operated, relay H is open-circuited. It restores a moment later, clearing out the established connection as described.

Normally, relay RCO operates as described before contacts 2 of TC have been opened. Counter TC is thereupon cleared out, and all of its operated contacts are restored, in response to an impulse received by winding R of electromagnet 204 through contacts 7 and 6 of relays RCO and PU, during the interval required for relay PU to restore following the described operation of RCO.

When conversation timing is used (jumper 302 in place), an interval of six to eight minutes is allowed for conversation to occur. With counter TC restored as described on the call being answered, conversation timing occurs in response to pulses from P1 of group 301, through jumper 302, contacts of local set 3 of V1, conductor 2 of group 212, and back contact 4 of relay TR to conversation timing conductor CT. Two-minute pulses on CT reach winding OP of CT through front contact 2 of BB. Thus, as long as relay BB is held energized over the called line, winding OP is energized every two minutes, to open contacts 1 to 4 of TC in succession. After contacts 1 and 2 of TC have been opened, the holding path for relay H is through contacts 3 of RCO and contacts 3 and 4 of TC.

If the conversation is still continuing (relays L and BB still both operated) when contact 4 of TC is opened (with contacts 1 to 3 being held open), the holding circuit of relay H is opened, which may occur from six to eight minutes after conversation is begun. The consequent restoration of H clears out the established connection.

If the conversation is earlier terminated after the circuit of the called line has been opened to restore relay BB, winding OP of 204 continues to be energized every two minutes over back contact 2 of relay BB to resume permanent timing over conductor PT. Permanent timing after conversation (RCO operated) endures for an interval of six to eight minutes which includes the interval during which conversation timing was employed.

If conversation timing is not desired, it suffices to remove jumper 202 at the ringing switch, which prevents pulses on P1 from reaching conductor CT in the connector.

When forced release of the connection occurs by the restoration of relay H by counter TC, responsive to the opening of contacts 2 or 4 of the counter, counter TC is permitted to remain in its operated condition until the connector C1 is again seized. At that time, the described preliminary energization of relay PU, in its seizing capacity with relay H restored, delivers a release pulse to winding R of TC through back contact 5 of H and contact 6 of PU, clearing out the timer TC for operation in connection with the new seizure of the connector.

NO-CHARGE OPERATION

Local calls for which no charge is to be assessed against the calling station are calls wherein the translator-controlled station-digit value is 13 or 15, as shown by the preceding stations-digit table. No-charge calls may be made to certain official stations or lines of the telephone operating company, as well as calls to police and fire departments, and the like. The telephone numbers involved are sometimes those of the single station or line, and sometimes those of a common number or PBX groups.

Referring to the connector receiver 400, it will be observed from the preceding code table that digit values 13 and 15 (the no-charge values) are the only ones in which code relays C1, C3, and C4 are all operated, being consequently the only ones in which storage relays S1, S3, and S4 are all operated. Contacts 1 of relays S1, S3, and S4 disconnect charge conductor CHG of group 351. Consequently, the described operation over CHG of 351, and over conductor 3 of group 305, of select magnet SM3 of the ringing switch to select local contact set 3 of verticals V1 to V15 is then prevented. For calls through connector C1, closure of local contact set 3 of vertical V1 is thereby prevented on no-charge local calls. Conductor 1 in group 212 is then not grounded. Reverse-battery relay RB thus does not respond to relay BB, and current flow is not reversed over the calling line.

An incidental effect of the failure of local contact set 3 of B1 to be closed under the described no-charge condition is the lack of connections from conductor P1 over conductors 1 and 2 of group 212 to conductors CT and PT, wherefore no operating pulses are delivered to timing counter TC. Accordingly, neither permanent timing nor conversation timing occurs on no-charge calls.

As further shown by the preceding stations-digit table, the ringing effect of station digits 11, 13, and 15 is the same as that for station digit 1, in that frequency F1 is applied to the tip conductor of the called line, because of the operation of select magnets U and 6 of the ringing switch to operate contact sets U and 6 of the concerned vertical of the ringing switch.

Operation of select magnet 6 for the ringing digit 11, 13, 15 is secured over conductor 442 of the connector receiver (a strapped extension from conductors 11, 13, and 15 of group 439) to select-magnet conductor SM6 in group 351.

Operation of select magnet U for station digits 11, 13, and 15 is from ground over branch conductor 431, conductor 433, and contacts 8 of relay UA.

PRELIMINARY RINGING

On calls to a PBX group of lines (a specific example of a common-number group), it is desirable to provide an immediate application of ringing current without waiting for the connector in use (such as C1) to provide the initial ringing application, which may not occur for some seconds. As shown by the preceding station-digit table, station-digit values 11 and 15 are assigned to calls to stations or lines which are to be accorded preliminary-ringing service. Preliminary-ringing service is given from the connector receiver through contacts of storage relays S1, S2, and S4 and over conductors GEN and PU of group 251.

As may be seen from the preceding code table, relays S1, S2, and S4 are all three operated only when the digit value is 11 or 15. When the station digit is 11 or 15, ground through contacts 1 of relay UA is extended through contacts 2, 1, and 2 of S4, S2, and S1, to conductor PU in group 251, immediately operating relay PU of connector C1 through contacts 9 of relay CH. Thereupon, uninterrupted ringing current from terminal 441 passes through contacts 3, 2, and 3 of S4, S2, and S1, to conductor GEN in group 251, and thence through front contact 2 of relay CH, whence it passes to the called line by way of contact 1 of relay PU, as soon as the described operation of hold magnet HM1 has occurred.

The preliminary-ringing operation is terminated shortly by the described clearing-out of the connector receiver responsive to the restoration of relays CH and ST. Relay PU of connector C1 is held locked operated upon the consequent operation of relays L and H.

TOLL CALLS

Toll calls, as from trunk IT of FIG. 1, are handled through the apparatus of FIGS. 2, 3, and 4 about as described for local calls, except for the receipt of class digit 4 for toll calls, as distinct from class digit 3 for local calls. Class digit 4 is at contact set 4 of vertical V16 pending the described receipt of the tens, units, and stations digits and the finding of the called line idle. Then, when control-ground conductor CG in group 351 is grounded by relay IDL, a circuit is thereby closed through a contact of set 4 in vertical V16 and over conductor 4 in group 305 for select magnet SM4, resulting in the selection of contact set 4 in vertical V1 to V16 for closure along with other contact sets of the vertical when a hold magnet such as HM1 operates as described.

Permanent timing is provided for toll calls through a contact of set 4 of vertical V1 from conductor P1 over conductor 3 of group 212, for operating counter TC as described for local calls. No conversation timing however, is provided for toll calls, since conductor 2 in group 212, over which conversation timing is controlled, is not connected at contact set 4 of V1. Accordingly, timing counter TC is not advanced during the conversation period, the period during which relay BB is operated. In the disclosed embodiment, the absence of conversation timing during toll calls is a prime distinction between toll-call operation and local-call operation of the connectors C1 to C15. A further distinction is that the described no-charge operation (controlled according to whether conductor CHG of 351 is, or is not, disconnected by S1, S2, and S4) does not apply to toll calls, since conductor CHG is not associated with contact set 4 of class vertical V16.

It will be observed that a contact of set 4 of V1 grounds conductor 4 of group 212 which leads to back contact 6 of relay TR. This back contact is shown disconnected in the connector C1, but may be used wherever desired for performing operations peculiar to toll calls.

VERIFICATION CALLS

As shown in the foregoing class table, class digit 2 is assigned to verification calls. On receipt of that digit in the connector receiver, select magnet SM2 is energized to select contact set 2 of vertical V16 and cause that set to be closed upon the described operation of HM16. One contact pair of set 2 extends conductor CG to 2 in group 305 for the selection of contact set 2 in any vertical V1 to V15 when the class digit is to be transferred thereto, and the other contact pair of set 2 of V16 extends the called-line-sleeve conductor CLS in group 351 to battery through local resistor 304 to provide an operating potential for idle relay ID1 of the receiver controller, during the described line-testing operation, irrespective of the marked condition of the called line. Consequently, relay IDL operates invariably following the described operation of relay TS. Thereupon, select magnet SM2 is operated over conductor 2 in group 305, along with other select magnets of the ringing switch to prepare for the closing of appropriate contact sets of vertical V1, assuming connector C1 to be the calling connector. Contact set 2 of vertical V1 is accordingly closed on the described operation of HM1, along with set U or L and one of the sets 6 to 10.

Contacts of verification set 2 of V1 connect conductors VT and BR of group 211 respectively to the associated conductors 1 and 2 of group 212, and connect RB of 211 to sleeve conductor S of CM1, representing the sleeve conductor of the called line. An additional contact of the set 4 of V1 grounds conductor 5 of group 212, thereby operating transfer relay TR.

Contacts 1 and 2 of TR disconnect the windings of relay BB from conductors T3 and R3 for a so-called "dry" connection with the called line; front contacts 3 and 4 of TR complete a connection directly to conductors T and R of CM1 from conductors T3 and R3 of the connector, independent of contact sets U and L and contacts of relay RCO. This direct connection is by way of contact pairs in verification set 5 of U1, conductors 1 and 2 of group 212, the front contacts 3 and 4 of relay TR. Telephonic communication from conductors T and R of trunk CT1 to the called line is thereby effected through condensers 203 and 204, and without applying foreign potentials to the conductors of the called line. The calling verification operator is thus able to hear whether or not conversation is being carried on over the called line. If it is, she may inform the conversing subscribers of the nature of the connection she is attempting to complete and offer to complete that connection (by clearing out and calling again) if the subscribers will clear out the connection in which they are involved.

For supervisory purposes, the sleeve conductor of the called line, as represented by conductor S in group CM1, is now extended through a contact pair of verification set 2 of V1, over conductor RB in group 211, and through contacts 4 of relay H, for operating reverse battery relay RB subject to the called line being marked busy, as it is if that line is included in a connection. The calling verification operator is informed of the marked busy condition of the called line by the reversal of current flow at contacts 2 and 3 of RB over conductors T and R of CT1. On the other hand, if the called line is idle, relay RB is not operated over the sleeve conductor of the called line. The direction of current flow over the calling connection is observable by the calling verification operator by her usual supervisory apparatus.

The verification connection is broken down as hereinbefore described upon the restoration of relays L and H. Among other things, HM1 and relay TR are permitted to restore.

TEST CALLS

Test calls, as from test desk 105 of FIG. 1 and through test repeater TR, 113, and FS11, are handled through the apparatus of FIGS. 1 to 4 generally as already described, except that the class digit transmitted to the connector receiver has the test value 5, as given in the preceding class table. Consequently, the contact set operated in class vertical V16 is set 5, through which a circuit is prepared for the operation of select magnet 5 when the described transfer of class information to any vertical V1 to V16 occurs. Also, a contact pair in test set 5 of V16 places battery from resistor 302 on conductor CLS in group 351 for operating idle relay IDL of the connector receiver irrespective of the marked condition of the called line. Accordingly, if C1 is the calling connector the described operation of HM1 closes contact set 5 of V1, along with the contact sets 6 to 10 and set U or L. Four contact pairs of group 5 connect conductors T, R, S, and RB of group 115 (from test repeater TR) respectively to conductors 1 and 2 in group 212, conductor S of CM1, and conductor 3 of group 212. The fifth contact pair of group 5 of V1 grounds conductor 5 of group 212 to operate transfer relay TR of the connector as described for verification calls. Conductors T and R of group 115 are now extended through contact pairs of group 5 of V1, over conductors 1 and 2 of group 212, and front contacts 3 and 4 of transfer relay TR to conductors T and R in connector multiple CM1, and thence to the corresponding conductors of the called line, and the sleeve conductor of the called line is connected to conductor S of group 115 through a contact pair of group 5 of V1, thereby giving direct test access to the tip, ring, and sleeve conductors of the called line from test repeater TR of FIG. 1.

If the testing operator so desires, he may cause conductor RB of group 115 to become grounded and ungrounded to operate and restore reverse-battery relay RB of connector C1, through a contact pair of group 5 of V1, over conductor 3 of group 212, and front contact 5 of relay TR. The resulting reversals of current flow over the calling loop, by contacts 2 and 3 of relay RB may be observed by the calling test operator through the usual supervisory apparatus.

The test connection is cleared out as described upon the restoration of relays L, H, and TR, along with magnet HM1.

CONNECTOR LOCK-OUT

A connector such as C1 may be required to be locked out of normal service temporarily in the event that a foreign ground connection is inadvertently made to sleeve conductor S of its trunk CT1, as by a temporary defect at the preceding switching stage.

It will be recalled that seizure of the connector receiver from CT1 is responsive to ground placed on sleeve conductor S thereof to operate relay PU in its seizing-control capacity through back contact 2 of relay H and back contact 4 of RB. It will be further recalled that seizure of the connector receiver from CT1 includes the operation in series of relays CH and ST, over conductor CH-IN of group 251. When relay ST operates, relay TM is arranged to release in perhaps one second unless its associated timing condenser is intermittently re-charged as described (through contacts 1 of relays RR and DR) incidental to the regularly occurring receipt of digit sets of code impulses. A false seizure, from the false grounding of conductor S of CT1, is not followed by the transmission of sets of code impulses. Accordingly, about one second later, relay TM restores since no code impulses have been received. On restoring, relay TM open-circuits auxiliary-timing relay TA, a slow-restoring relay which remains operated for a substantial fraction of a second. Back contact 3 of TM grounds conductor R of group 251 and of CT1 to give a busy-signal indication to the calling register sender in the event that the seizure is through a register sender which has developed a defect which prevents it from sending code impulses. Contacts 2 of TM remove ground from conductor 414, the source ground for seizing conductor SZ of 351, and places ground on conductor 415 which extends to conductor SM1 of group 351, thereby operating select magnet SM1 of the ringing switch. Contacts of SM1 operate relay ON as described, which grounds conductor 412. A circuit is thereby closed, through contacts 1 of the restored relay TM, over conductor HM in group 251, and contacts 1 of CH, for operating hold magnet HM1 of vertical V1. Lockout contact set 1 of vertical V1 is thereby closed. Relay TR is thereby operated over conductor 5 of group 211. The false seizing ground on conductor S of CT1 is now extended over originating-sleeve conductors OS in group 211, a contact pair of lockout group 1 of V1, conductor 3 in group 212, front contact 3 of transfer relay TR, to operate relay RB of the connector.

When RB now operates, its contacts 5 additionally open conductor IT to maintain trunk CT1 marked busy to the preceding switches, and its contacts 1 complete a holding circuit for magnet HM1, from ground through a contact pair of group 1 of V1, conductor 4 of group 212, front contact 6 of relay TR, contacts 1 of RB, and conductor HM of group 210. Hold magnet HM1, relay TR, and relays RB are thereby held in a locked, operated condition so long as ground potential is maintained on conductor S of CT1, and CT1 is marked busy at contacts 5 of RB.

In the connector receiver, relay TA disconnects relay ST from conductor CH-IN upon restoring shortly after the described restoration of TM. Relays ST and CH are thereby restored, and the connector receiver clears out responsive to the restoration of relay ST. Relays TM and TA thereby reoperate in succession, preparing the connector receiver to receive calls from other connectors.

A further seizure of the connector receiver from the locked out trunk CT1 from connector C1 is prevented by contacts 4 of the locked relay RB of C1, which maintain the upper winding of relay PU disconnected from conductor S of CT1.

When the grounded condition of conductor S of CT1 is cleared, the circuit of relay RB is thereby opened. Relay RB thereupon restores, open-circuiting hold magnet HM1. The restoration of HM1 restores contact set 1 of V1, thereby permitting relay DR to restore. Connector C1 is again in normal condition and its trunk CT1 is again marked idle, over its conductor IT, to the switches having access thereto.

While we have described the principles of our invention in connection with specific apparatus, it is to be clearly understood that this description is made only by way of example and not as a limitation to the scope of our invention.

We claim:

1. In a switching system wherein connections having respective different service requirements are extended from calling lines over connector trunks to respective desired called ones of a group of lines, means for completing the said connections comprising a group of connectors each having access to the said group of lines, said connector trunks terminating in the connectors respectively, each connector including a separate group of separately selectable adapting contact sets which correspond respectively to the respective adapting contact sets of any other connector of the group, each adapting contact set of any connector being operable to adapt it for meeting a different service requirement of a said connection extended to the connector over the said trunk which terminates therein, selecting apparatus common to the said trunks and connectors, means responsive to a connection extended from a calling line to any said trunk for temporarily setting the common selecting apparatus from such trunk to select in each connector of the group the adapting contact set thereof which corresponds to the particular service requirement of the last said connection, a separate contact-set operating means for each connector, and means for causing the contact-set operating means of the connector in which the last said trunk terminates to operate the one of the adapting contact sets of such connector which stands temporarily selected by the common selecting apparatus.

2. In a switching system according to claim 1, a crossbar switch having select magnets and having hold magnets cooperating therewith for the selective actuation of crosspoint sets of contacts, the select magnets comprising the said common selecting apparatus, the said hold magnets comprising the said separate actuating means, and the crosspoint sets of contacts associated with any said hold magnet comprising the said separately selectable sets of contacts.

3. In a switching system according to claim 2, a connector receiver common to the said connector trunks and connectors, means responsive to the extension of a connection over a connector trunk to a connector for rendering the connector receiver temporarily individual to such trunk and connector, receiving means in the connector receiver for receiving digit information over the individualized connector trunk indexing the class of the connection and indexing the called line, first means controlled by the said receiving means for positioning the said connector switching apparatus to extend a connection from the individualized connector to the indexed called line, and second means controlled by the said receiving means for setting the said select magnets according to the indexed class of the connection.

4. A switching system according to claim 3, wherein the said crossbar switch also has digit-storage hold magnets common to the said connectors, with each such hold magnet controlling a separate group of sets of contacts selectable by the said select magnets, such hold magnets and sets of contacts being included in the said first means and the said second means controlled by the said receiving means, the said receiving means receiving digits in succession, means for setting the said select magnets successively according to respective received digits, and means for operating the digit-storage hold magnets in succession in timed sequence with the successive settings of the said select magnets.

5. A switching system according to claim 1, wherein the calling lines are classified, the said service requirements of a connection depending upon the class of the calling line, the said means for operating the said selecting apparatus including means for operating it according to the classification of the calling line.

6. A switching system according to claim 1, wherein the calling lines and the called lines are classified, the said service requirements of a connection dependng jointly upon the class of the calling line and upon the class of the called line, the said means for operating the said selecting apparatus including means for operating it jointly according to the classification of the calling line and the classification of the called line.

7. A switching system according to claim 1, wherein at least some of the called lines are multi-station lines, with each station on a multi-station line occupying a separate station location thereon, the said means for setting the said common selecting apparatus including means for setting such selecting apparatus according to the station location on the called line of the called station, the said separately selectable contact sets of any connector serving to apply ringing current to the called line according to the location thereon of the called station.

8. In a switching system wherein connections having respective different service requirements are extended from calling lines over connector trunks to respective desired called ones of a group of lines, means for completing the said connections comprising a group of connectors each having access to the said group of lines, said connector trunks terminating in the connectors respectively, each connector including separately selectable adapting contact sets for adapting it to control and supervise connections therethrough according to their respective service requirements, digit-receiving apparatus for receiving, over any connector trunk taken for use, digit information indexing the called line to which the connection over the last said trunk is to be extended and indexing the service requirements of the connection, first means controlled by the digit-receiving apparatus for causing the last said connector to extend the last said connection to the indexed called line, and second means controlled by the digit-receiving apparatus for selecting and operating the said adapting contact set of the last said connector which corresponds to the received digit information and indexing the service requirements of the connection.

9. A switching system according to claim 8, wherein the calling lines are divided into classes and the called lines include multi-station lines, the said separately selectable contact sets of any said connector comprising two groups, the contact sets of one group corresponding to respective station locations on the called line, the contact sets of the other group corresponding to the respective classes of the calling lines, the said second means controlled by the digit-receiving apparatus including means for operating a contact set of the said one group to cause the called station on the called line to be signalled, the said second means also including means for operating a contact set of the said other group to adapt the connector according to the class of the calling line.

10. In a switching system according to claim 9, the said separately selectable contact sets including a lockout set of contacts, means responsive to the taking for use of any connector trunk for applying a seizure signal thereto to cause seizure of the said digit-receiving apparatus, if idle, for the temporary exclusive use of the last said connector trunk and associated connector, timing means in the digit-receiving apparatus responsive to the failure of digit information to be received after any such seizure for operating the said lockout set of contacts of the seizing connector, means responsive thereto for freeing the seized digit-receiving apparatus and for preventing a continued seizure signal on the associated connector trunk from causing further seizure of the digit-receiving apparatus.

11. In a switching system according to claim 9, means in any said connector for applying ringing current intermittently to the called line, and means in the said receiving apparatus, depending upon the receipt of digit information indicating that the called line is of a predetermined class, for applying a preliminary ringing signal to the called line.

12. A switching system according to claim 8, wherein the calling lines are divided into classes, the said separately selectable contact sets of any said connector including contact sets corresponding respectively to the said classes, the said second means controlled by the said digit-receiving apparatus including means for operating a said contact set to adapt the connector according to the class of the calling line.

13. A switching system according to claim 8, wherein the calling lines are divided into classes comprising local lines; long-distance, or toll, lines; verification lines; and test lines; the said separately selectable contact sets of any said connector corresponding respectively to said classes, the said second means controlled by the said digit-receiving apparatus including means for operating the selectable contact set which corresponds to the class of the calling line, means responsive to the operation of either the toll-class or the local-class contact set for adapting the connector to apply ringing current to the called line and to supply talking current to the called line when the call is answered, and means responsive to the operation of either the verification-class or the test-class contact set for adapting connector to withhold both ringing current and talking current from the called line.

14. In a switching system according to claim 13, means responsive to the said operation of the said local-class contact set, and non-responsive to the said operation of the said toll-class contact set, for adapting the connector to place a time limit on conversation over the established connection.

15. In a switching system according to claim 13, wherein a charge for answered local calls is assessed against at least some of the calling local lines or calling stations thereon, the charge assessment depending upon the placing of an answered-supervisory signal on the connector trunk over which the connection is extended, each said connector including a supervisory relay for placing such a supervisory signal on the connector trunk, an operating circuit for the supervisory relay controlled from the called line on local calls subject to the said local-class contact set being operated, certain called lines being no-charge lines, and means responsive to the called line being a no-charge line for preventing operation of the local-class contact set of the connector through which the connection is extended.

16. In a switching system according to claim 13, means further responsive to the said operation of the said verification-class contact set for closing a talking connection from the talking conductors of the connector trunk to those of the called line irrespective of whether the called line is marked busy or idle.

17. In a switching system according to claim 16, means in the calling connector for supplying a supervisory signal over the calling connector trunk indicating whether the called line is marked busy or idle.

18. In a switching system according to claim 13, test conductors common to the connectors of the group, and means further responsive to the said operation of the said test-class contact set of any connector of the group for connecting the said test conductors respectively to the conductors of the called line instead of connecting conductors local to the calling connector trunk and connector to the called line.

References Cited in the file of this patent

UNITED STATES PATENTS

| | | |
|---|---|---|
| 2,585,904 | Busch | Feb. 19, 1952 |
| 2,629,016 | Gooderham | Feb. 17, 1953 |
| 2,857,468 | Karow | Oct. 21, 1958 |